April 4, 1950     J. P. BADENHAUSEN     2,502,637
STEAM GENERATOR

Filed Sept. 19, 1945     3 Sheets-Sheet 1

Inventor
John Phillips Badenhausen
By   B.T.Wobensmith
Attorney

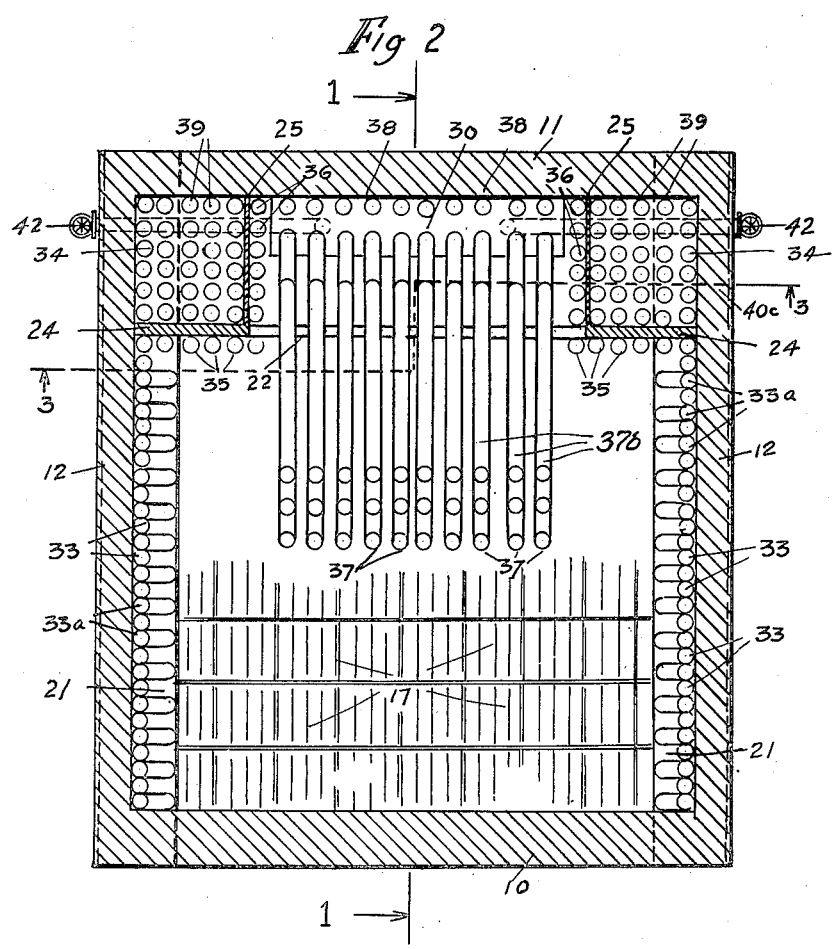

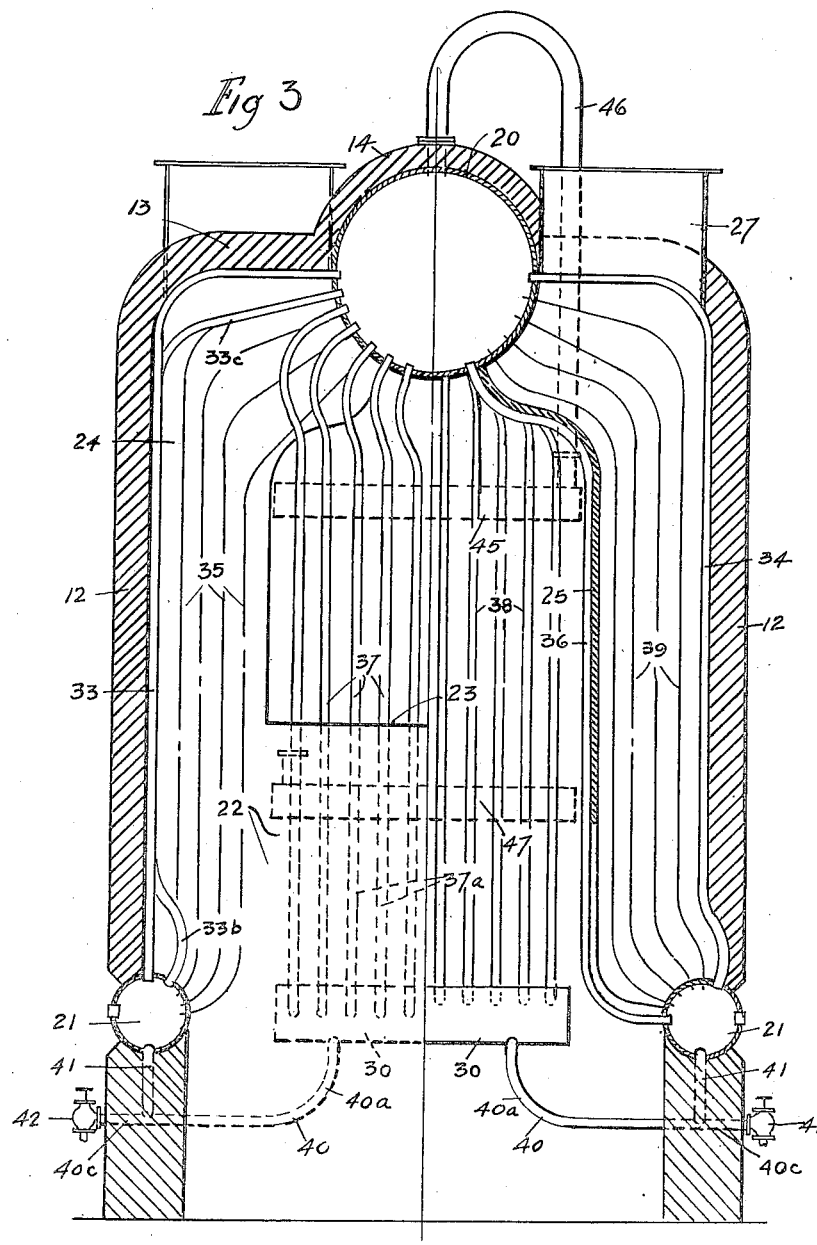

Patented Apr. 4, 1950

2,502,637

UNITED STATES PATENT OFFICE 2,502,637

STEAM GENERATOR

John Phillips Badenhausen, Philadelphia, Pa.

Application September 19, 1945, Serial No. 617,213

3 Claims. (Cl. 122—235)

This invention relates to steam generators, and more particularly to steam generators having a high capacity for the space required.

This invention further relates to steam generators having an improved circulation of water for preventing overheating of and injury to the steam generating tubes.

In accordance with the present invention also, a steam generator is provided having an increased steam output by reason of the use of a plurality of tubes subjected to radiant and convection heating and advantageously located for this purpose.

Other advantageous features of the invention will be apparent from the specification and claims.

The nature and characteristic features of the invention will be more readily understood from the following description, taken in connection with the accompanying drawings forming part hereof, in which:

Fig. 2 is a horizontal sectional view of the steam generator illustrated in Fig. 1, and taken approximately on the line 2—2 of Fig. 1; and Fig. 3 is a transverse sectional view taken approximately on the line 3—3 of Fig. 2.

Figure 1:
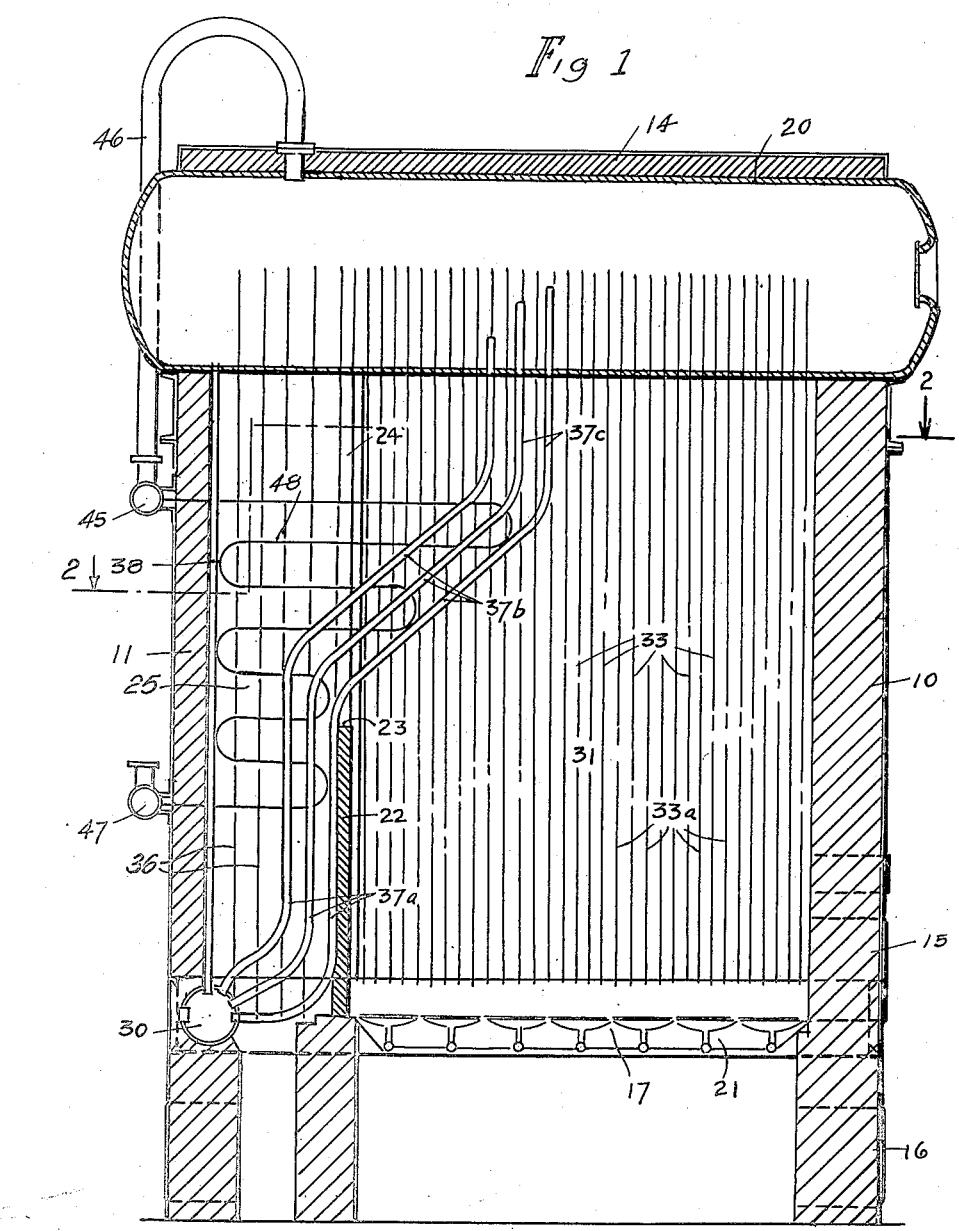
Figure 1 is a vertical central sectional view of a steam generator in accordance with the present invention, taken approximately on the line 1—1 of Fig. 2.

It should of course be understood that the description and drawings herein are illustrative merely, and that various modifications and changes may be made in the structure disclosed without departing from the spirit of the invention.

Referring more particularly to the drawings, the steam generator in accordance with the present invention preferably includes a vertical front wall 10, a vertical rear wall 11 spaced from the front wall 10 and parallel thereto, spaced parallel side walls 12 and horizontal top wall sections 13, bridged and connected by a central top wall section 14. The front wall 10 may be provided with an opening 15 for the introduction of fuel, and an ashdoor or access opening 16, located below a grate 17.

An upper steam and water drum 20 is provided, preferably extending longitudinally forwardly beyond the front wall 10 and rearwardly beyond the rear wall 11. Each of the side walls 12 is provided, at the lower part thereof, with a lower horizontal water header 21, to which access may be obtained to the interior at the front and rear ends thereof within the front wall 10 and the rear wall 11, respectively.

Spaced rearwardly from the front wall 10 and extending between the side walls 12, an upwardly extending transverse wall or baffle 22 is provided, terminating at the central portion thereof at a horizontal edge 23. The wall or baffle 22 has side portions 24 extending upwardly on each side above the terminal edge 23 and then inwardly at the upper parts thereof to the steam and water drum 20. The side portions 24 extend to the top wall sections 13.

Spaced inwardly from the top wall sections 13 and the side walls 12, and on each side, a downwardly extending longitudinally disposed wall or baffle 25 is provided in the space between the rear wall 11 and the wall or baffle 22. The walls 25 terminate above the headers 21 and at a suitable location to permit the passage of gases thereunder, as hereinafter explained. At the lower portion of the rear wall 11 and preferably at the same level as the lower side wall headers 21, a transverse horizontal water header 30 is provided, the ends thereof preferably terminating approximately below the walls or baffles 25.

A combustion chamber 31 is thus provided in the space above the grate 17, between the side walls 12, to the rear of the front wall 10, in front of the wall or baffle 22, and below the drum 20 and the top wall sections 13.

The side walls 12, between the front wall 10 and the wall or baffle 22, are preferably each lined with a plurality of closely spaced steam generating riser tubes 33 which extend from the lower water headers 21, upwardly along the side walls 12 and along the top wall sections 13 to the steam and water drum 20. Alternate tubes 33a of the banks of tubes 33 may be offset at the lower portions 33b thereof for connection into the lower headers 21, and upper portions 33c of the alternate tubes 33a may be offset downwardly from the top wall sections 13 for connection into the drum 20. The side walls 12, between the wall or baffle 22 and the rear wall 11, are preferably also provided with steam generating riser tubes 34 which extend from the lower headers 21, upwardly along the side walls, and then to the steam and water drum 20.

A plurality of steam generating riser tubes 35 are also preferably provided along the front of the side portions 24 of the wall or baffle 22 and extend from the headers 21, upwardly along the side portions 24 and to the steam and water drum 20. The inner portions of the walls or baffles 25 are also preferably lined with a bank of steam generating riser tubes 36 which extend from the lower headers 21, upwardly and along the interior faces of the walls or baffles 25 and to the steam and water drum 20.

The spaces provided on each side between the side walls 12 and the walls or baffles 25 and to the rear of the side portions 24 of the wall or baffle 25 are preferably provided with a plurality of steam generating riser tubes 39 which extend inwardly and upwardly from the headers 21 then extend upwardly generally parallel to the side walls 12 and then extend to the steam and water drum 20, gas discharge ducts 27 being provided from the tops of these spaces in communication with the stack (not shown).

In order to increase further the steam output capacity of the steam generator heretofore described, a plurality of steam generating riser tubes 37 are provided which extend first forwardly and upwardly from the header 30, then vertically upwardly substantially parallel to the rear wall 11 and the wall or baffle 22 as at 37a, then forwardly and upwardly at an inclination as at 37b to a location above the midportion of the grate 17, and then vertically upwardly as at 37c to the steam and water drum 20. The tubes 37 are confined to the space between the side portions 24 and are disposed in a plurality of rows from front to rear.

Along the rear wall 11, a bank of downcomer tubes 38 are provided, which extend from the steam and water drum 20 downwardly to the header 30.

Connections are provided between the headers 21 and the header 30 which may be used, in addition to providing for circulation, for feed water supply or for blowdown. These connections preferably include tubes 40 which are connected to the header 30 at spaced locations at the lower part thereof. The tubes 40 extend downwardly as at 40a and then outwardly as at 40c below the headers 21 to which they are connected by vertical pipes 41. The tubes 40, at their outer ends and outside the side walls 12 may be provided with control valves 42.

A superheater is provided which includes an upper superheater header 45, extending transversely along the rear wall 11 and connected to the drum 20 by a steam pipe 46. A superheater discharge header 47 is also provided on the rear wall 11, below the superheater header 45. A plurality of superheater tubes 48 are provided which are disposed forwardly of the rear wall 11, for convection heating by the downward movement of the combustion gases to the rear of the wall or baffle 22. The superheater tubes 48 preferably also extend forwardly and in advance of the wall or baffle 22 in heat exchange relationship with the combustion gases and for the absorption of heat released in the combustion chamber 31.

The mode of operation of the steam generator in accordance with the present invention will now be pointed out.

Fuel delivered to the grate 17 burns thereon and develops a rising stream of burning gases which pass upwardly in the combustion chamber 31. The combustion gases rise towards the top of the combustion chamber 21 and pass rearwardly over the upper terminal edge 23 of the wall or baffle 22. The combustion in the combustion chamber liberates heat for steam generation by radiant heat in the side wall tubes 33, and the tubes 35 disposed along the front of the side portions 24 of the wall or baffle 22, for delivery to the steam and water drum 20. The heat released by the burning fuel is also effective as radiant heat for steam generation in the inclined portions 37b and vertical portions 37c of the tubes 37, for delivery to the steam and water drum 20, as well as on exposed portions of the drum 20.

The gases of combustion then pass downwardly in the space to the rear of the wall or baffle 22 and in further contact with the lower portions of the tubes 37, for heating the same by convection. The tubes 36, disposed along the walls or baffles 25 are also exposed to the heat of the combustion gases for steam generation. The gases of combustion at the lower part of their downward travel divide and pass around the lower ends of the walls or baffles 25, and then pass upwardly in the spaces therealong and in contact with the steam generating tubes 39, where they give up further heat by convection for steam generation.

The gases then pass to the discharge ducts 27, which are adapted to be connected to an induced draft fan (not shown) for delivery to the stack (not shown) or directly connected to the stack (not shown).

It will be noted that the transverse header 30 is fed from the steam and water drum 20 by the downcomer tubes 38. The interconnection of the transverse header 30 and the side wall headers 21 by the tubes 41 and 40 also serves to feed the transverse header 30 from the headers 21 and to feed the headers 21 from the header 30 as required. An equalization of feed is thus provided which improves the circulation of the water in the steam generator.

I claim:

1. In a steam generator, front, rear, side, and top walls, an upper steam and water drum extending between said front and said rear walls, lower water headers at the lower portions of each of said side walls, a transverse wall intermediate said front and said rear walls and extending at the sides thereof to said top wall and providing a rear boundary of the combustion space, said transverse wall having a central opening for the passage of combustion gases, downwardly extending walls spaced inwardly from said side walls and connecting said transverse wall and said rear wall said downwardly extending walls having lower terminal edges spaced above the level of said lower water headers to permit the passage of gases around said edges, banks of steam generating tubes lining said side walls, banks of steam generating tubes connecting said lower water headers and said drum disposed in the spaces between said downwardly extending walls and said side walls, a transverse header at the lower part of said rear wall, and a plurality of rows of steam generating riser tubes extending from said transverse header to said drum and having the lower portions thereof extending upwardly to the rear of said transverse wall and the upper portions thereof extending forwardly with respect to said transverse wall and upwardly to said drum, said rows of tubes being connected to said drum intermediate said transverse wall and said front wall.

2. In a steam generator, spaced front and rear walls, spaced side walls, top wall sections, an upper steam and water drum extending between said front and said rear walls, lower water headers at the lower portions of each of said side walls, a transverse wall intermediate said front and said rear walls and extending upwardly to said top wall sections and providing a rear boundary of the combustion space, said transverse wall having an opening for the passage of gases therethrough, walls spaced inwardly from said side walls connecting said transverse wall and said rear wall and each having an opening in the lower part thereof for the passage of gases, banks or steam generating tubes lining said walls and exposed to the heat of the combustion gases, banks of steam generator tubes connected to said drum and disposed between said rear wall and said transverse wall and between said inwardly spaced walls and said side walls, a transverse header at the lower part of said rear wall, and a plurality of rows of steam generating riser tubes extending upwardly from said transverse header forwardly through the opening in said transverse wall and to said steam and water drum intermediate said transverse wall and said front wall.

3. In a steam generator, front and rear walls, side walls, top wall sections, an upper horizontal steam and water drum extending between said front and said rear walls, lower horizontal water headers at the lower portions of each of said side walls, a transverse wall intermediate said front and said rear walls and extending to said top wall sections and providing a rear boundary of the combustion space, said transverse wall having a central opening for the passage of gases therethrough, downwardly extending longitudinal walls spaced inwardly from said side walls connecting said transverse wall and said rear wall and having openings in the lower part thereof for the passage of gases, banks of steam generating tubes lining said walls and exposed to the heat of the combustion gases, banks of steam generating riser tubes connecting said lower water headers and said drum and disposed in the space between said downwardly extending walls and said side walls, a transverse header at the lower part of said rear wall, and a plurality of rows of steam generating riser tubes extending upwardly from said transverse header forwardly through the opening in the transverse wall, and said rows of tubes being connected to said steam and water drum intermediate said front wall and said transverse wall.

JOHN PHILLIPS BADENHAUSEN.

REFERENCES CITED

The following references are of record in the file of this patent:

UNITED STATES PATENTS

| Number | Name | Date |
|---|---|---|
| 1,925,026 | Austin | Aug. 29, 1933 |
| 2,097,268 | Best | Oct. 26, 1937 |
| 2,342,148 | Keenan | Feb. 22, 1944 |